(12) United States Patent
Turner et al.

(10) Patent No.: US 10,830,252 B2
(45) Date of Patent: Nov. 10, 2020

(54) CENTRIFUGAL PUMP ASSEMBLIES HAVING AN AXIAL FLUX ELECTRIC MOTOR AND METHODS OF ASSEMBLY THEREOF

(71) Applicants: Regal Beloit America, Inc., Beloit, WI (US); Regal Beloit Australia Pty Ltd., Rowville (AU)

(72) Inventors: Matthew J. Turner, Rowville (AU); Greg Heins, Rowville (AU); Mark Thiele, Rowville (AU); Jason Jon Kreidler, Sheboygan, WI (US)

(73) Assignees: REGAL BELOIT AUSTRALIA PTY LTD, Rowville (AU); REGAL BELOIT AMERICA, INC., Beloit, WI (US)

( * ) Notice: Subject to any disclaimer, the term of this patent is extended or adjusted under 35 U.S.C. 154(b) by 118 days.

(21) Appl. No.: 15/418,103

(22) Filed: Jan. 27, 2017

(65) Prior Publication Data
US 2018/0216634 A1    Aug. 2, 2018

(51) Int. Cl.
*F04D 29/58* (2006.01)
*F04D 13/06* (2006.01)
(Continued)

(52) U.S. Cl.
CPC ..... *F04D 29/5806* (2013.01); *F04D 13/0606* (2013.01); *F04D 13/0666* (2013.01);
(Continued)

(58) Field of Classification Search
CPC ............. F04D 13/0606; F04D 13/0666; F04D 29/4233; F04D 29/4293; F04D 29/5806;
(Continued)

(56) References Cited

U.S. PATENT DOCUMENTS 3,671,137 A    6/1972  Ball
4,277,111 A    7/1981  Gray et al.
(Continued)

FOREIGN PATENT DOCUMENTS

| JP | 2004011525 A | | 1/2004 | |
| WO | 2000037804 A1 | | 6/2000 | |
| WO | WO 0037804 | * | 6/2000 | ......... F04D 13/0666 |

OTHER PUBLICATIONS

Simanek, Donald E. "Discussion of the Classic Magnetic Motor." Lock Haven University, www.lockhaven.edu/~dsimanek/museum/cheng2.htm. (Year: 2013).*
(Continued)

*Primary Examiner* — Patrick Hamo
*Assistant Examiner* — Joseph S. Herrmann
(74) *Attorney, Agent, or Firm* — Armstrong Teasdale LLP (57) ABSTRACT

An electric motor assembly for pumping a fluid through a fluid cavity includes a stator assembly including a plurality of conduction coils configured to transmit heat energy to the fluid within the fluid cavity. The electric motor assembly also includes a rotor assembly positioned adjacent the stator assembly to define an axial gap therebetween. The electric motor assembly also includes an impeller directly coupled to the rotor assembly opposite the stator assembly such that the rotor assembly and the impeller are configured to rotate about an axis. The rotor assembly and the impeller are configured to be submerged in the fluid within the fluid cavity.

19 Claims, 7 Drawing Sheets

(51) Int. Cl.
*H02K 5/128* (2006.01)
*F04D 29/42* (2006.01)
*H02K 21/24* (2006.01)

(52) U.S. Cl.
CPC ....... *H02K 5/1285* (2013.01); *F04D 29/4293* (2013.01); *H02K 21/24* (2013.01)

(58) Field of Classification Search
CPC ........ H02K 5/128; H02K 5/1285; H02K 9/19; H02K 21/24
See application file for complete search history.

(56) References Cited

U.S. PATENT DOCUMENTS

| | | | |
|---|---|---|---|
| 4,319,790 A | 3/1982 | Thomson | |
| 4,615,662 A | 10/1986 | Laing | |
| 4,644,202 A * | 2/1987 | Kroy | F04D 13/0666 277/412 |
| 4,806,080 A * | 2/1989 | Mizobuchi | B24C 1/04 384/123 |
| 4,867,633 A | 9/1989 | Gravelle | |
| 5,125,754 A | 6/1992 | Ide | |
| 5,163,812 A | 11/1992 | Klaus | |
| 5,250,863 A | 10/1993 | Brandt | |
| 5,316,440 A | 5/1994 | Kijima et al. | |
| 5,358,339 A | 10/1994 | Konno et al. | |
| 5,393,145 A | 2/1995 | Ide | |
| 5,407,331 A * | 4/1995 | Atsumi | F02M 37/048 417/420 |
| 5,767,606 A * | 6/1998 | Bresolin | H02K 5/1285 310/162 |
| 5,911,512 A | 6/1999 | Lee | |
| 5,939,813 A | 8/1999 | Schob | |
| 5,951,169 A | 9/1999 | Oklejas et al. | |
| 5,997,261 A | 12/1999 | Kershaw et al. | |
| 6,010,246 A | 1/2000 | Gomyo et al. | |
| 6,012,909 A * | 1/2000 | Sloteman | F04D 13/0666 415/58.2 |
| 6,036,435 A | 3/2000 | Oklejas | |
| 6,071,093 A * | 6/2000 | Hart | F04D 29/041 384/100 |
| 6,132,186 A * | 10/2000 | Cooper | F04D 13/0666 310/44 |
| 6,201,329 B1 | 3/2001 | Chen | |
| 6,271,612 B1 | 8/2001 | Tanaka et al. | |
| 6,293,769 B1 | 9/2001 | Radermacher et al. | |
| 6,422,838 B1 | 7/2002 | Sloteman | |
| 6,439,845 B1 | 8/2002 | Veres | |
| 6,505,970 B2 | 1/2003 | Takahashi et al. | |
| 7,265,939 B2 | 9/2007 | Kuwajima et al. | |
| 7,431,688 B2 * | 10/2008 | Wampler | F04D 29/047 600/16 |
| 7,534,725 B2 | 5/2009 | Shen et al. | |
| 8,303,268 B2 | 11/2012 | Werson et al. | |
| 8,353,687 B2 * | 1/2013 | Werson | F04D 13/0666 310/156.32 |
| 8,487,378 B2 | 7/2013 | Goto et al. | |
| 8,729,634 B2 | 5/2014 | Shen et al. | |
| 8,826,213 B1 | 9/2014 | Ho et al. | |
| 8,852,673 B2 | 10/2014 | Laing et al. | |
| 8,887,106 B2 | 11/2014 | Ho et al. | |
| 9,029,263 B1 | 5/2015 | Kim et al. | |
| 9,863,430 B2 | 1/2018 | Lee et al. | |
| 10,323,654 B2 | 6/2019 | Zhang et al. | |
| 2002/0052113 A1 | 5/2002 | Khan et al. | |
| 2002/0094281 A1 | 7/2002 | Khanwilkar et al. | |
| 2004/0236420 A1 | 11/2004 | Yamane et al. | |
| 2005/0147512 A1 * | 7/2005 | Chen | F16C 32/0459 417/423.12 |
| 2006/0247486 A1 | 11/2006 | Mendler | |
| 2010/0272592 A1 | 10/2010 | Chien et al. | |
| 2011/0238172 A1 | 9/2011 | Akdis et al. | |
| 2014/0282326 A1 | 9/2014 | Chen et al. | |
| 2014/0322020 A1 | 10/2014 | Wampler et al. | |
| 2014/0377101 A1 | 12/2014 | Muller | |
| 2015/0017031 A1 | 1/2015 | Blad | |
| 2015/0162206 A1 | 6/2015 | Liao et al. | |
| 2016/0131141 A1 | 5/2016 | Sato et al. | |
| 2016/0247685 A1 | 8/2016 | Chen et al. | |

OTHER PUBLICATIONS

"Open vs. Closed Impellers." Mc Nally Institute, www.mcnallyinstitute.com/14-html/14-02.htm. (Year: 2004).*
PCT International Search Report and Written Opinion for related application PCT/US18/15446 dated May 25, 2018; 13 pp.
PCT International Search Report and Written Opinion for related application PCT/US18/15455 dated May 25, 2018; 13 pp.
WW, Bill, and Instructables. "Determine How Magnetic Field Varies With Distance." Instructables.conn, Instructables, Oct. 25, 2017; 7 pp.
Office Action for Chinese Patent Application 201880021654.9 dated Jul. 21, 2020; 20 pp.

* cited by examiner

CENTRIFUGAL PUMP ASSEMBLIES HAVING AN AXIAL FLUX ELECTRIC MOTOR AND METHODS OF ASSEMBLY THEREOF

BACKGROUND

The field of the disclosure relates generally to centrifugal pump assemblies, and more specifically, to centrifugal pump assemblies that include an axial flux electric motor coupled to an impeller.

At least some known centrifugal pumps include an impeller for channeling a fluid through the pump. The impeller is coupled to a shaft that is also coupled to a rotor of an electric motor such that rotation of the rotor causes rotation of the impeller. In at least some known electric motors, the rotor is spaced from a stator such that there is an ever present axial force of attraction between the magnets on the rotor and the steel core of the stator. The axial force may be large enough such that the bearing system of the motor requires special design considerations to withstand this axial force. Additionally, the rotating impeller imparts kinetic energy into the pumped fluid as it spins, which increases the pressure of the fluid. There is a resulting axial suction force acting on the impeller as this pressure increases. In at least some known centrifugal pumps, the axial suction force may also require bearing system design considerations.

Furthermore, at least some known centrifugal pumps are located in environments that may cause the fluid being channeled therethrough to freeze when the pump is non-operational. When the fluid freezes, the impeller may be locked in place and subsequent attempts to rotate the impeller before defrosting the fluid may result in a shortened service lifetime of the impeller or the entire pump. Additionally, in at least some centrifugal pumps, the stator of the electric motor generates a relatively high amount of heat and may require a complex and high cost cooling system.

BRIEF DESCRIPTION

In one aspect, an electric motor assembly is provided. The electric motor assembly includes a stator assembly and a rotor assembly positioned adjacent the stator assembly to define an axial gap therebetween. The stator assembly is configured to impart a first axial force on the rotor assembly. The electric motor assembly also includes an impeller directly coupled to the rotor assembly opposite the stator assembly such that the rotor assembly and the impeller are configured to rotate about an axis. A fluid channeled by the impeller imparts a second axial force on the impeller.

In another aspect, a pump assembly is provided. The pump assembly includes a pump housing and a motor housing coupled to the pump housing. The pump assembly also includes an electric motor assembly including a stator assembly and a rotor assembly positioned adjacent the stator assembly to define an axial gap therebetween. The stator assembly is configured to impart a first axial force on the rotor assembly. The electric motor assembly also includes an impeller directly coupled to the rotor assembly opposite the stator assembly such that the rotor assembly and the impeller are configured to rotate about an axis. A fluid channeled by the impeller imparts a second axial force on the impeller.

In yet another aspect, a method of assembling a pump assembly is provided. The method includes providing a stator assembly and coupling a rotor assembly to the stator assembly such that an axial gap is defined therebetween. The stator assembly is configured to impart a first axial force on the rotor assembly. The method also includes coupling an impeller directly to the rotor assembly opposite the stator assembly such that the rotor assembly and the impeller are configured to rotate about an axis. A fluid channeled by the impeller is configured to impart a second axial force on the impeller.

In one aspect, an electric motor assembly for pumping a fluid through a fluid cavity is provided. The electric motor assembly includes a stator assembly including a plurality of conduction coils configured to transmit heat energy to the fluid within the fluid cavity. The electric motor assembly also includes a rotor assembly positioned adjacent the stator assembly to define an axial gap therebetween. The electric motor assembly also includes an impeller directly coupled to the rotor assembly opposite the stator assembly such that the rotor assembly and the impeller are configured to rotate about an axis. The rotor assembly and the impeller are configured to be submerged in the fluid within the fluid cavity.

In another aspect, a pump assembly is provided. The pump assembly includes a pump housing that defines a fluid cavity and a motor housing coupled to the pump housing. The pump assembly also includes an electric motor assembly including a stator assembly positioned within the motor housing and including a plurality of conduction coils configured to transmit heat energy to the fluid within the fluid cavity. The electric motor assembly also includes a rotor assembly positioned adjacent the stator assembly and within the pump housing. The electric motor assembly also includes an impeller directly coupled to the rotor assembly opposite the stator assembly such that the rotor assembly and the impeller are configured to rotate about an axis. The rotor assembly and the impeller are configured to be submerged in the fluid within the fluid cavity.

In yet another aspect, a method of assembling a pump assembly for pumping a fluid through a fluid cavity is provided. The method includes providing a stator assembly including a plurality of conduction coils that are configured to transmit heat energy to the fluid within the fluid cavity. The method also includes positioning a rotor assembly adjacent the stator assembly such that an axial gap is defined therebetween and coupling an impeller directly to the rotor assembly opposite the stator assembly such that the rotor assembly and the impeller are configured to rotate about an axis. The rotor assembly and the impeller are configured to be submerged in the fluid within the fluid cavity.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
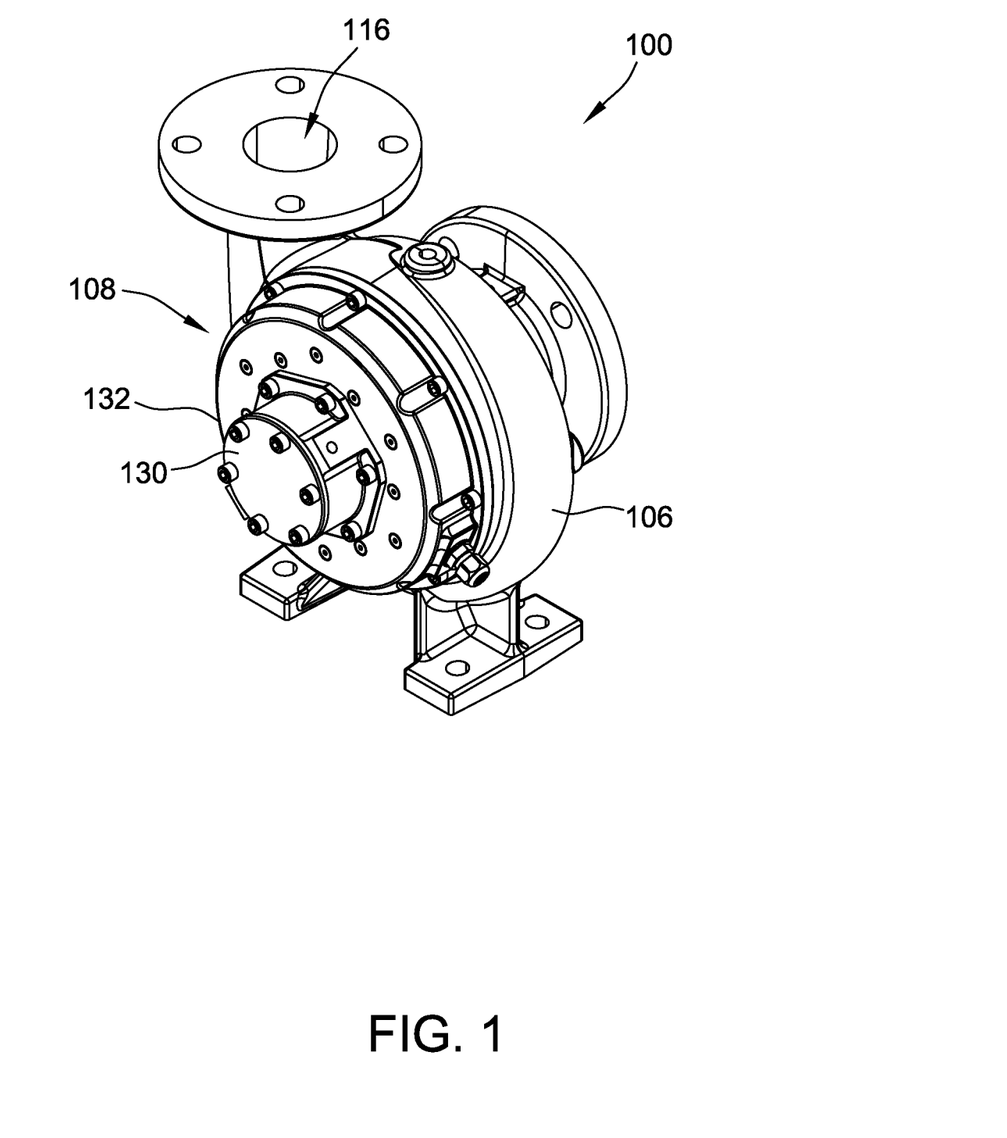
FIG. 1 is a perspective view of an exemplary centrifugal pump.
Figure 2:
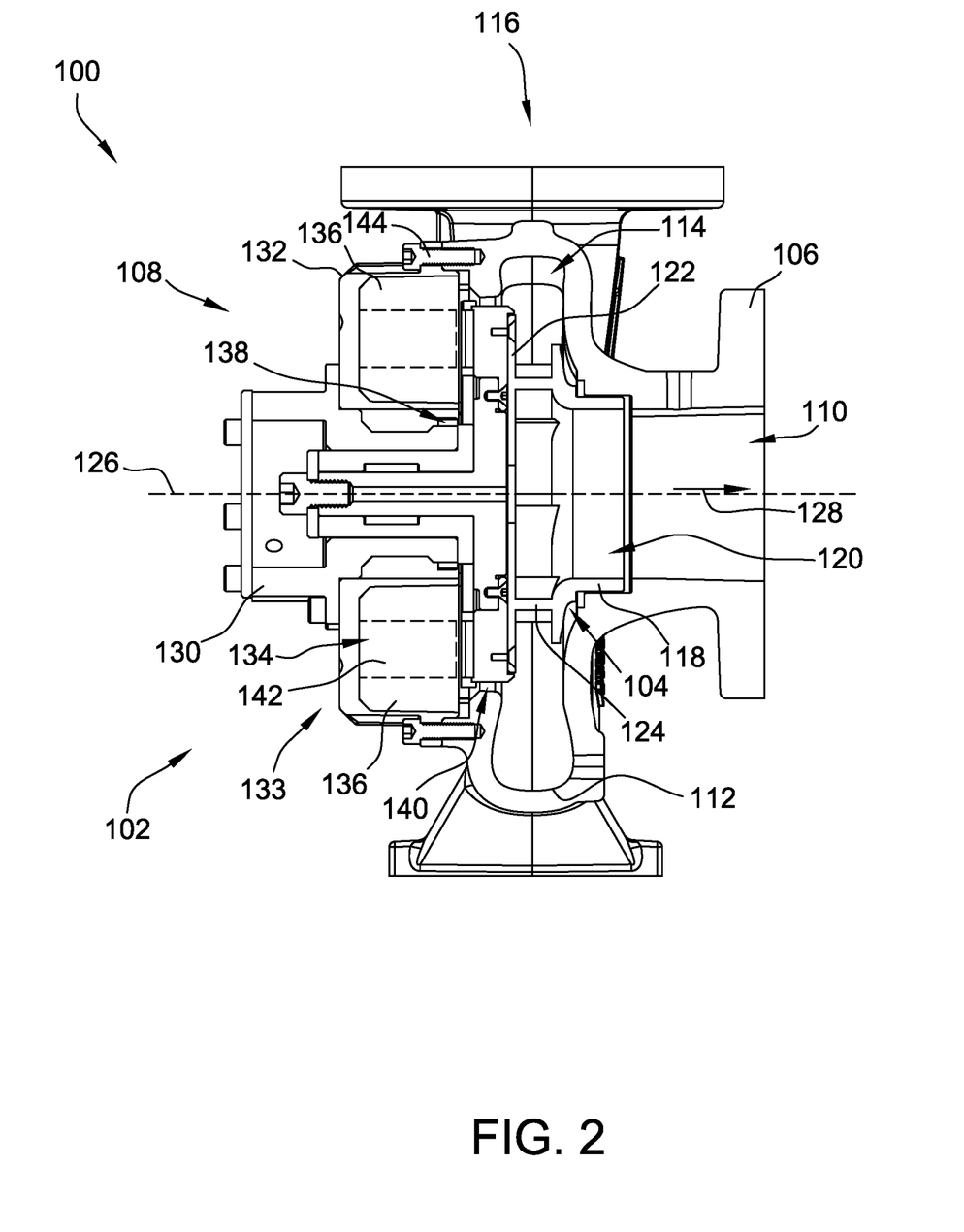
FIG. 2 is a cross-sectional view of the centrifugal pump shown in FIG. 1.
Figure 3:
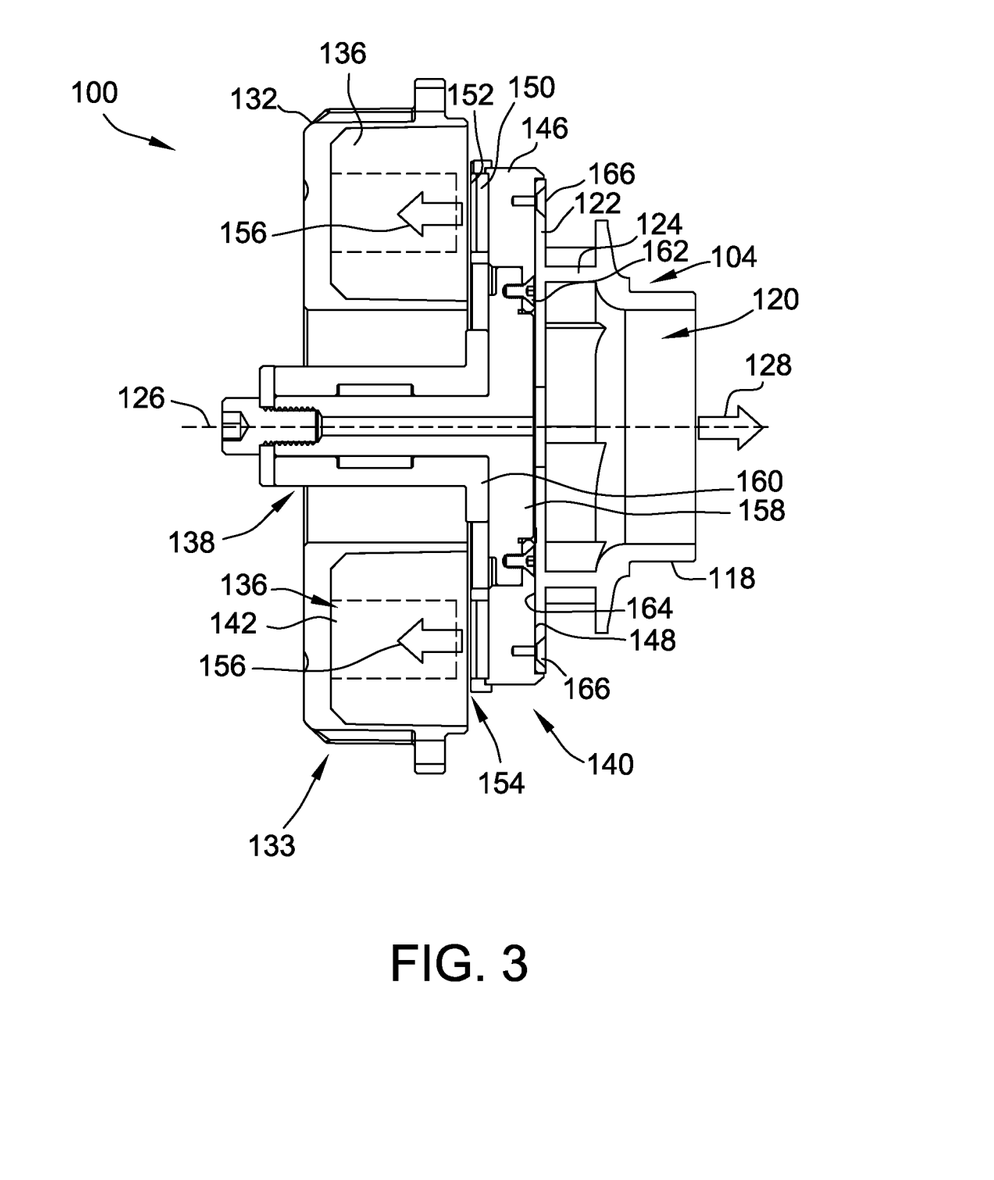
FIG. 3 is an enlarged cross-sectional view of the centrifugal pump shown in FIG. 2 illustrating an electric motor and an impeller.

FIG. 1 is a perspective view of an exemplary centrifugal pump assembly 100. FIG. 2 is a cross-sectional view of pump assembly 100 illustrating an axial flux electric motor assembly 102, an impeller 104, and a pump housing 106. FIG. 3 is an enlarged cross-sectional view of electric motor assembly 102 and impeller 104 with pump housing 106 removed for clarity. In the exemplary embodiment, pump assembly 100 includes pump housing 106 and a motor housing 108. Pump housing 106 encloses impeller 104 and at least a portion of motor assembly 102, while motor housing 108 encloses motor assembly 102. Pump housing 106 includes a fluid inlet 110, a scroll wall 112 defining a portion of a fluid flow channel 114, and a fluid outlet 116. In operation, fluid flows through inlet 110 and is directed through channel 114 around wall 112 until the fluid exits pump 100 through housing outlet 116.

In the exemplary embodiment, impeller 104 is positioned within pump housing 106 and includes an inlet ring 118 that defines an inlet opening 120. Impeller 104 also includes a rear plate 122 and a plurality of blades 124 coupled between inlet ring 118 and rear plate 122. As described in further detail herein, rear plate 122 of impeller 102 is coupled directly to motor assembly 102 such that motor assembly 102 is configured to rotate impeller 102 about a rotational axis 126. In operation, motor 102 rotates impeller 104 about axis 126 to draw fluid in an axial direction into pump housing 106 through housing inlet 110. The fluid is channeled through inlet opening 120 in inlet ring 118 and turned by blades 124 within channel 114 to direct the fluid along wall 112 and radially through housing outlet 116. The amount of fluid moved by pump assembly 100 increases as impeller 104 speed increases such that impeller 104 generates high velocity fluid flow that is exhausted from outlet 116.

Impeller 104 imparts kinetic energy into the pumped fluid as it rotates that causes the fluid to pressurize. In the exemplary embodiment, the pressurized fluid imparts an axial suction force 128 on impeller 104. Axial force 128 acts in an axial direction away from motor assembly 102 through pump housing inlet 110. As the speed of impeller 104 increases, both the pressure of the fluid and the resulting axial suction force 128 also increase correspondingly. That it, the magnitude of axial suction force 128 is based on the rotational speed of impeller 104.

In the exemplary embodiment, motor assembly 102 includes motor housing 108 including a first portion 130 and a second portion 132. Motor assembly 102 also includes a stator assembly 133 including a magnetic stator core 134 and a plurality of conductor coils 136. Motor assembly 102 also includes a bearing assembly 138 and a rotor assembly 140. Each conductor coil 136 includes an opening (not shown) that closely conforms to an external shape of one of a plurality of stator core teeth 142 such that each stator tooth 142 is configured to be positioned within a conductor coil 136. Motor assembly 102 may include one conductor coil 136 per stator tooth 142 or one conductor coil 136 positioned on every other tooth 142. Stator core 134 and coils 136 are positioned within second portion 132 of motor housing 108, which is coupled to pump housing 106 with a plurality of fasteners 144.

In the exemplary embodiment, a variable frequency drive (not shown) provides a signal, for example, a pulse width modulated (PWM) signal, to motor 102. In an alternative embodiment, motor 102 may include a controller (not shown) coupled to conductor coils 136 by wiring. The controller is configured to apply a voltage to one or more of conductor coils 136 at a time for commutating conductor coils 136 in a preselected sequence to rotate rotor assembly 140 about axis 126.

Rotor assembly 140 is positioned within pump housing 106 proximate channel 114 and includes a back iron or rotor disk 146 having at least a first axial surface 148. Rotor assembly 140 also includes a magnet retainer 150 coupled to rotor disk 146 opposite impeller 104 and a plurality of permanent magnets 152 coupled to magnet retainer 150 using an adhesive. Alternatively, magnets 152 may be coupled to magnet retainer 150 using any retention method that facilitates operation of motor 102 as described herein. In another embodiment, magnets 152 are coupled directly to rotor disk 146.

In the exemplary embodiment, rotor assembly 140 is positioned adjacent stator assembly 133 to define an axial gap 154 therebetween. As described above, voltage is applied to coils 136 in sequence to cause rotation of rotor assembly 140. More specifically, coils 136 control the flow of magnetic flux between magnetic stator core 134 and permanent magnets 152. Magnets 152 are attracted to magnetic stator core 134 such that an axial magnetic force 156 is ever-present across gap 154. As such, stator core 134 of stator assembly 133 imparts axial magnetic force 156 to rotor assembly 140 in an axial direction away from impeller 104. More specifically, axial magnetic force 156 acts in a direction opposite of axial suction force 128 of impeller 104. As the size of axial gap 154 decreases, the axial magnetic force 156 between stator assembly 133 and rotor assembly 140 increases. That is, the magnitude of axial magnetic force 156 is based on a length of axial gap 154.

Rotor disk 146 is coupled to a rotating component 158 of bearing assembly 138 and stator assembly 133 is coupled to a stationary component 160 of bearing assembly 138. In the exemplary embodiment, bearing assembly 138 includes a hydrodynamic bearing wherein rotating component 158 is coupled to rotor disk 146 using a plurality of fasteners 162. In other embodiments, bearing assembly 138 includes any bearing type that facilitates operation of motor 102 as described herein.

As best shown in FIG. 3, impeller 104 is directly coupled to rotor assembly 140 opposite stator assembly 133 such that impeller 104 contacts rotor assembly 140 to enable rotation of impeller 104 and rotor assembly 140 about axis 126. As used herein, the term "directly" is meant to describe that rotor assembly 140 is coupled to impeller 104 without any intermediate structure positioned therebetween to separate rotor assembly 140 from impeller 104. More specifically, rotor disk 146 is directly coupled to impeller 104. Even more specifically, rotor disk 146 is directly coupled to rear plate 122 of impeller 104. In one embodiment, axial surface 148 of rotor disk 146 is coupled to and directly contacts an axial surface 164 of rear plate 122 in a face-to-face relationship. In the exemplary embodiment, and as shown in FIG. 3, rotor disk 146 is coupled to impeller back plate 122 using a plurality of fasteners 166. In another embodiment, rotor assembly 140 is integrally formed with impeller 104. More specifically, rotor disk 146 is integrally formed with rear plate 122 of impeller 104 such that rotor disk 146 and rear plate 122 form a single, monolithic component. Generally, rotor assembly 140 and impeller 104 are directly coupled together using any attachment means that facilitates operation of pump assembly 100 as described herein. As described above, conventional pumps include a shaft that couples the rotor assembly to the impeller. However, in one embodiment described herein, as shown in FIGS. 2 and 3, pump assembly 100 does not include a shaft coupled between rotor assembly 140 and impeller 104 as impeller 104 is directly coupled to and contacting rotor assembly 140.

In operation, conductor coils 136 coupled to stator core 134 are energized in a chronological sequence that provides an axial magnetic field which moves clockwise or counter-clockwise around stator core 134 depending on the predetermined sequence or order in which conductor coils 136 are energized. This moving magnetic field intersects with the flux field created by the plurality of permanent magnets 152 to cause rotor assembly 140 to rotate about axis 126 relative to stator assembly 133 in the desired direction. As described above, the magnetic attraction between stator core 134 and magnets 152 creates axial magnetic force 156 that acts in a direction away from impeller 104. Furthermore, because rotor disk 146 is directly coupled to impeller 104, rotation of rotor disk 146 causes rotation of impeller 104. As described above, rotation of impeller 104 pressurizes the fluid flowing therethrough, which imparts axial suction force 128 on impeller 104 in a direction away from rotor assembly 140. As shown in FIG. 3, axial suction force 128 acts in an opposite direction of axial magnetic force 156. In the embodiment, when rotor disk 146 is coupled directly to impeller 104, axial magnetic force 156 opposes axial suction force 128 to reduce the sum of the forces, which facilitates extending the service lifetime of bearing assembly 138. In some embodiments, forces 156 and 128 are equal such that they cancel each other out.

Furthermore, in the exemplary embodiment, axial gap 154 is adjustable to modify the magnitude of axial magnetic force 156. Additionally, motor assembly 102 is a variable speed motor, so the speed of impeller 104 can also be adjusted to adjust the axial suction force 128 of the fluid. Modifying at least one of air gap 154 and the speed of impeller 104 facilitates creating a desires bias within pump assembly 100 either towards motor assembly 102 or towards pump 106. So by reducing the resultant force within pump assembly 100 and by biasing the resultant force to towards motor assembly 102 or towards pump 106, it is possible to use a simple and low cost bearing assembly 138 for the integrated pump assembly 100.

Figure 4:
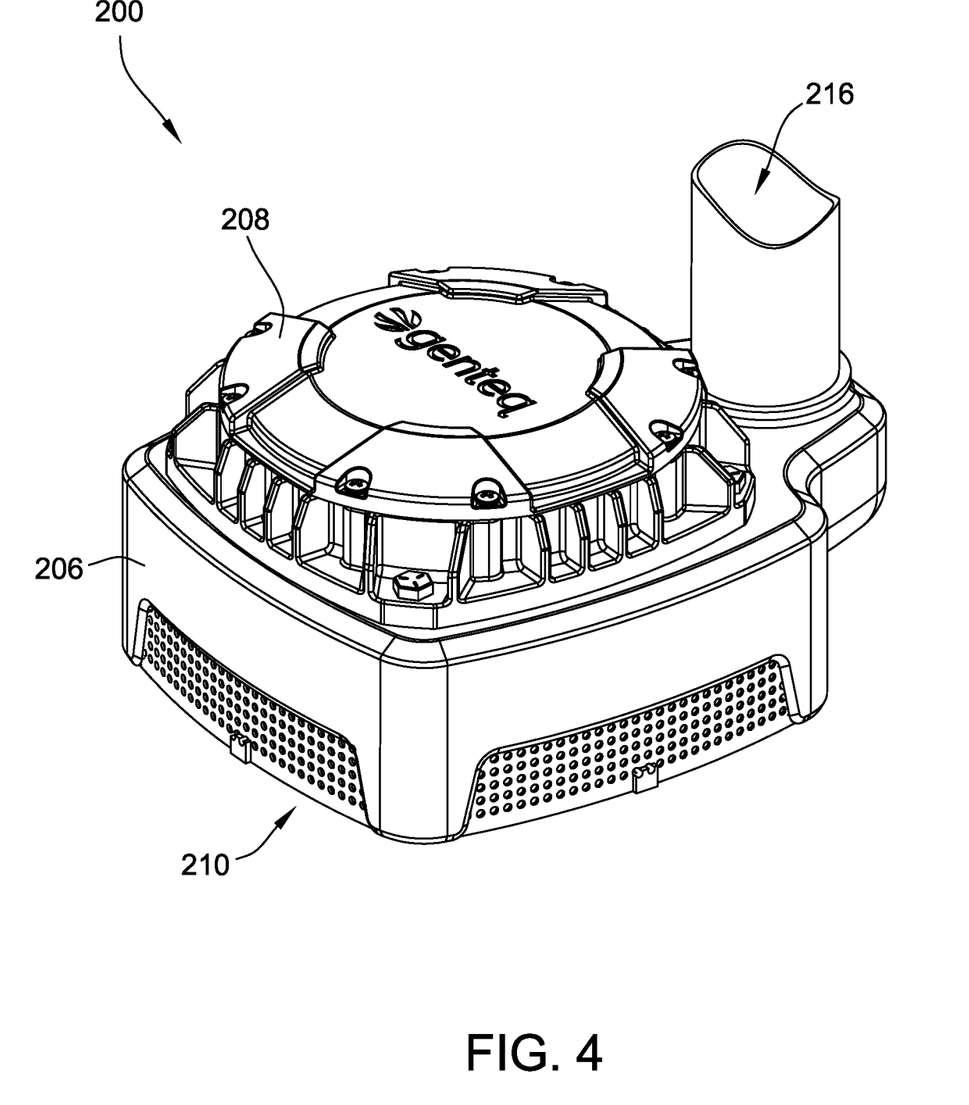
FIG. 4 is a perspective view of an alternative embodiment of a centrifugal pump.
Figure 5:
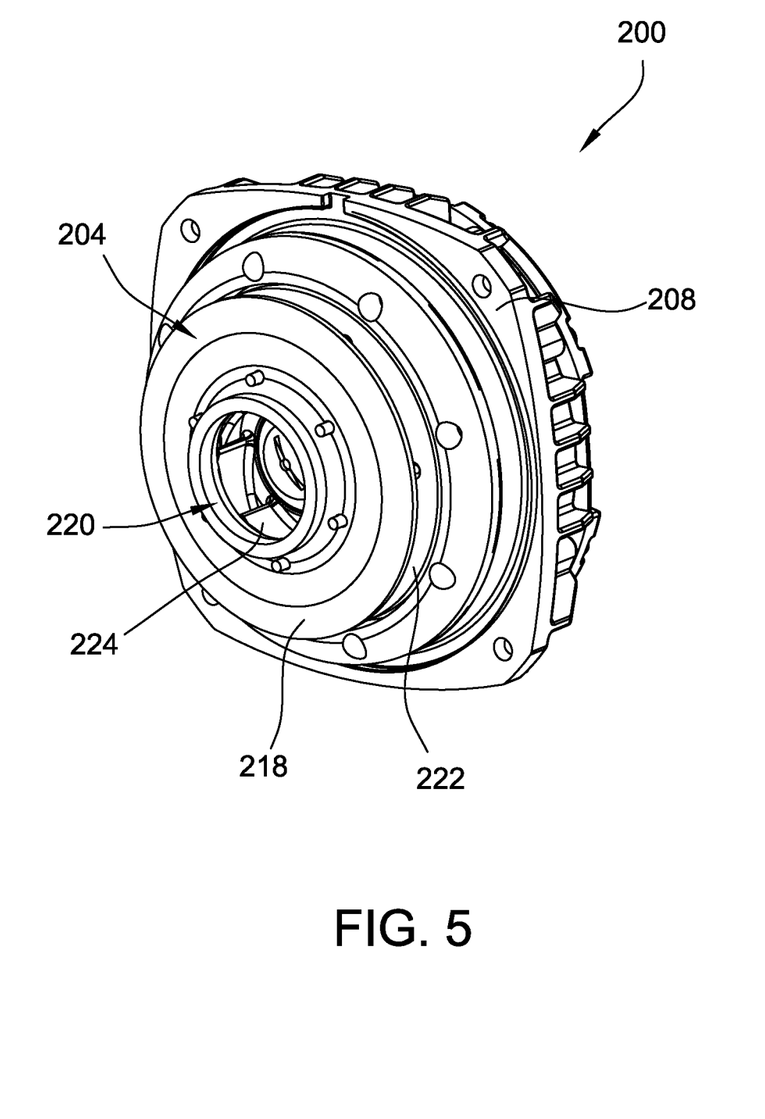
FIG. 5 is a bottom perspective view of the centrifugal pump shown in FIG. 4 illustrating an impeller.
Figure 6:
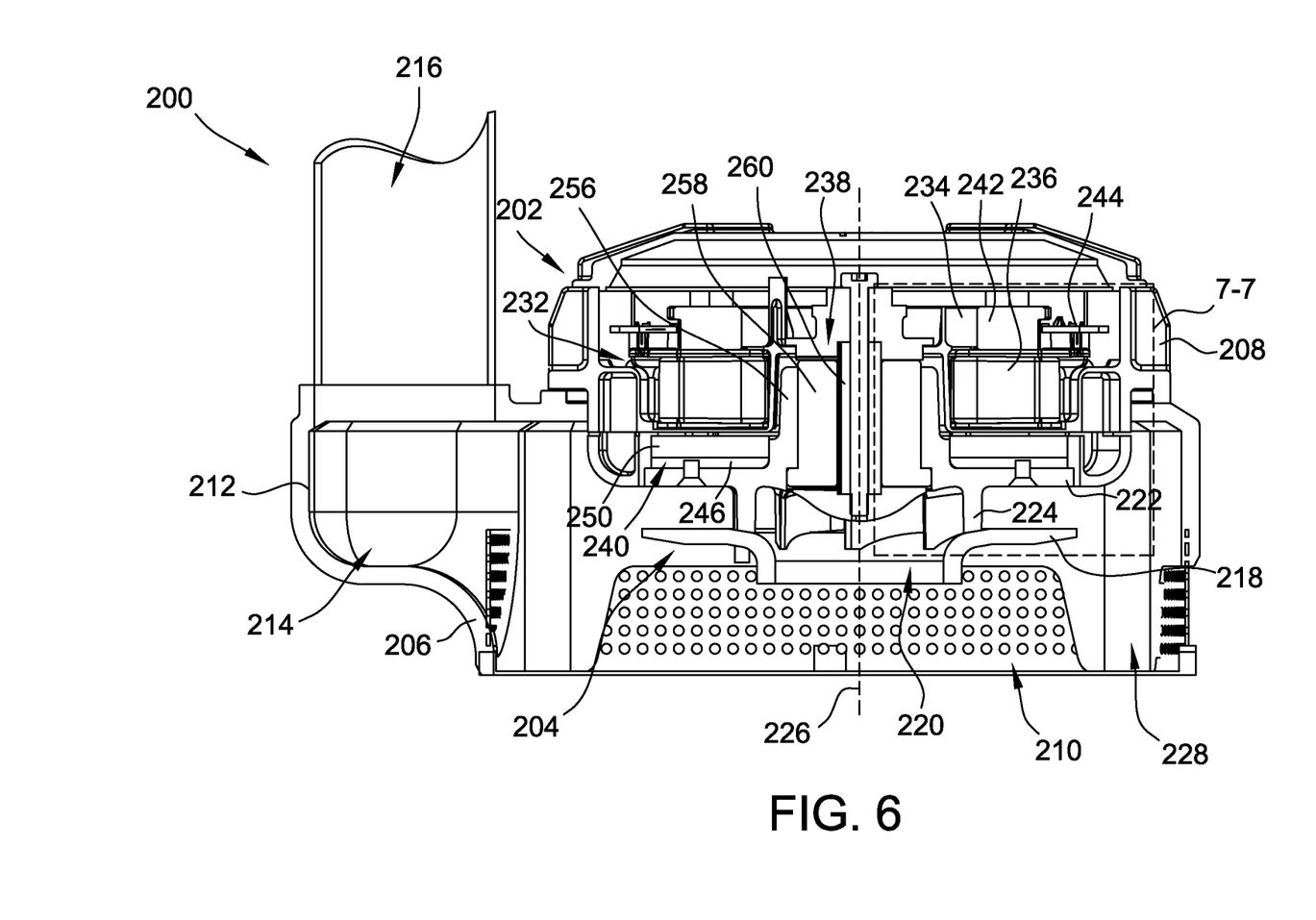
FIG. 6 is a cross-sectional view of the centrifugal pump shown in FIG. 4 illustrating the impeller and an electric motor.
Figure 7:
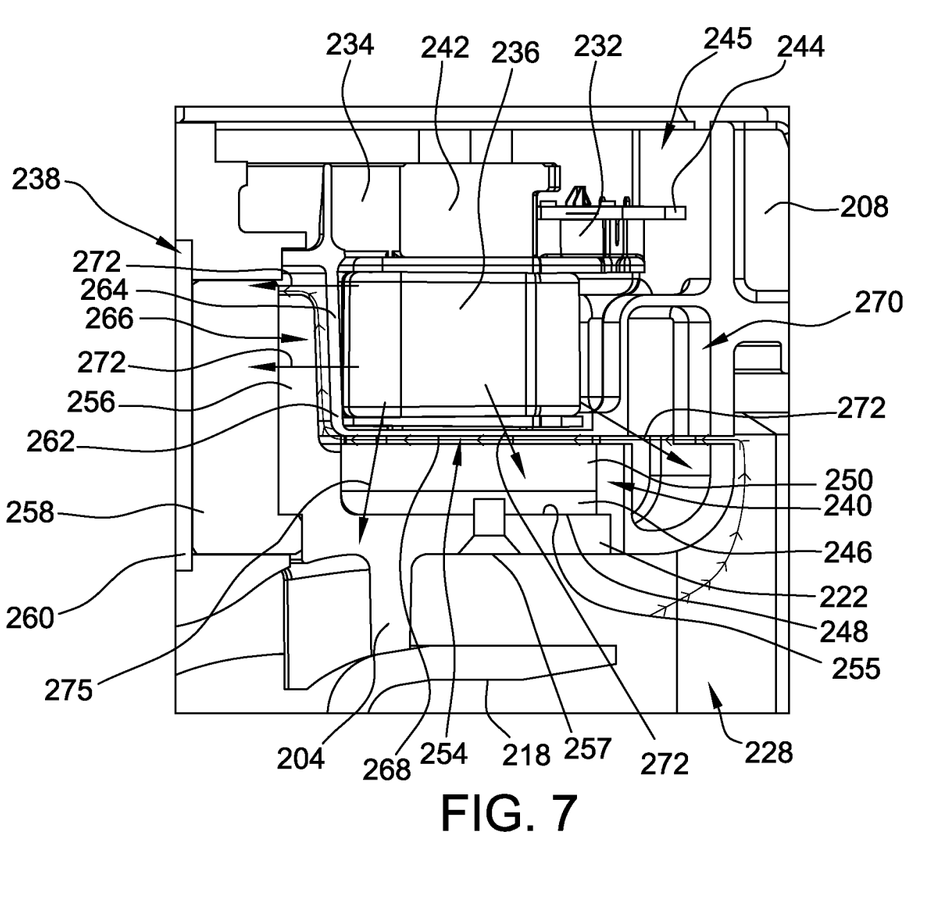
FIG. 7 is an enlarged cross-sectional view of a portion of the electric motor and the impeller bounded by box 7-7 in FIG. 6.

FIG. 4 is a perspective view of an alternative embodiment of a centrifugal pump assembly 200 illustrating a pump housing 206 and a motor housing 208. FIG. 5 is a bottom perspective view of centrifugal pump assembly 200 with pump housing 206 removed for clarity and illustrating an impeller 204. FIG. 6 is a cross sectional view of pump assembly 200 illustrating impeller 204 and an axial flux electric motor assembly 202, and FIG. 7 is an enlarged cross-sectional view of a portion of electric motor assembly 202 and impeller 204 bounded by box 7-7 in FIG. 6.

In the exemplary embodiment, pump assembly 200 includes a pump housing 206 and a motor housing 208. Pump housing 206 encloses impeller 204 and at least a portion of motor assembly 202, while motor housing 208 encloses motor assembly 202. Pump housing 206 includes a fluid inlet 210, a scroll wall 212 defining a portion of a fluid flow channel 214, and a fluid outlet 216. In operation, fluid flows through inlet 210 and is directed through channel 214 around wall 212 until the fluid exists pump 200 through housing outlet 216.

In the exemplary embodiment, impeller 204 is positioned within pump housing 206 and includes an inlet ring 218 that defines an inlet opening 220. Impeller 204 also includes a rear plate 222 and a plurality of blades 224 coupled between inlet ring 218 and rear plate 222. As described in further detail herein, rear plate 222 of impeller 202 is coupled directly to motor 202 such that motor 202 is configured to rotate impeller 202 about a rotational axis 226. In operation, motor 202 rotates impeller 204 about axis 226 to draw fluid in an axial direction into a fluid cavity 228, defined by pump housing 206, through housing inlet 210. The fluid is channeled through inlet opening 220 in inlet ring 218 and turned by blades 224 within channel 214 to direct the fluid along wall 212 within cavity 228 and through housing outlet 216. The amount of fluid moved by pump assembly 200 increases as impeller 204 speed increases such that impeller 204 generates high velocity fluid flow that is exhausted from outlet 216.

In the exemplary embodiment, motor assembly 202 includes a stator assembly 232 including a magnetic stator core 234 and a plurality of conductor coils 236. Motor assembly 202 also includes a bearing assembly 238 and a rotor assembly 240. Each conductor coil 236 includes an opening (not shown) that closely conforms to an external shape of one of a plurality of stator core teeth 242 such that each stator tooth 242 is configured to be positioned within a conductor coil 236. Motor assembly 202 may include one conductor coil 236 per stator tooth 242 or one conductor coil 236 positioned on every other tooth 242.

In the exemplary embodiment, motor assembly 202 also includes an electronics module 244 that controls operation of motor assembly 202. In one embodiment, electronics module 244 is coupled to conductor coils 236 by wiring and is configured to apply a voltage to one or more of conductor coils 236 at a time for commutating conductor coils 236 in a preselected sequence to rotate rotor assembly 240 about axis 226. As shown in FIG. 6, electronics module 244 is coupled to stator assembly 232 and positioned, along with stator assembly 232, within a cavity 245 defined by motor housing 208.

Rotor assembly 240 is positioned within fluid cavity 228 of pump housing 206 and includes a back iron or rotor disk 246 having at least a first axial surface 248 (shown in FIG. 7). In the exemplary embodiment, rotor assembly 240 also includes at least one permanent magnet 250 coupled to rotor disk 246 opposite impeller 204 using an adhesive. Alternatively, magnet 250 may be coupled to rotor disk 246 using any retention method that facilitates operation of motor assembly 202 as described herein. In another embodiment, magnet 250 is coupled to a magnet retainer, which is then coupled to rotor disk 246. Furthermore, magnet 250 is one of a single, ring-shaped magnet or a plurality of magnets.

In the exemplary embodiment, rotor assembly 240 is positioned adjacent stator assembly 232 to define an axial gap 254 (shown in FIG. 7) therebetween. Furthermore, impeller 204 is directly coupled to rotor assembly 240 opposite stator assembly 232 such that impeller 204 and rotor assembly 240 rotate about axis 226 and are positioned within fluid cavity 228 and are submerged in the fluid within fluid cavity 228. More specifically, rotor disk 246 is coupled to impeller 204. Even more specifically, rotor disk 246 is coupled to rear plate 222 of impeller 204. In one embodiment, axial surface 248 of rotor disk 246 is coupled to an axial surface 255 of rear plate 222 in a face-to-face relationship. In the exemplary embodiment, and as shown in FIG. 7, rotor disk 246 is coupled to impeller back plate 222 using a plurality of fasteners 257. In another embodiment, rotor assembly 240 is integrally formed with impeller 204. More specifically, rotor disk 246 is integrally formed with rear plate 222 of impeller 204. Generally, rotor assembly 240 and impeller 204 are directly coupled together using any attachment means that facilitates operation of pump assembly 200 as described herein.

In the exemplary embodiment, impeller 204 includes a cylindrical extension 256 that extends axially from rear plate 222 towards motor housing 208. Extension 256 is coupled to a rotating component 258 of bearing assembly 238. Rotating component 258 circumscribes a stationary component 260 of bearing assembly 238. In the exemplary embodiment, bearing assembly 238 includes a hydrodynamic bearing. In other embodiments, bearing assembly 238 includes any bearing type that facilitates operation of motor 102 as described herein.

As best shown in FIG. 7, motor housing 208 also includes a wall 262 that separates fluid cavity 228 from stator assembly 232 and that at least partially defines cavity 245. More specifically, wall 262 limits the flow of the fluid to within pump housing 206 and substantially seals stator assembly 232 and electronics module 244 from fluid cavity 228. In the exemplary embodiment, wall 262 includes an axial portion 264 positioned immediately radially inward of conductor coils 236 such that a radial gap 266 is formed between wall axial portion 264 and impeller extension 256. As described herein, gap 266 enables fluid flow between wall 262 of motor housing 208 and extension 256 of impeller 204. Furthermore, wall 262 also includes a radial portion 268 extending radially within axial gap 254 between stator assembly 232 and rotor assembly 240. Additionally, wall 262 defines a fluid channel 270 that is in fluid communication with fluid cavity 228 radially outward of conductor coils 236. In the exemplary embodiment, as described in further detail below, wall portions 264 and 268 form a barrier between fluid cavity 228 and motor cavity 245 that houses stator assembly 232 and electronics module 244. Wall portions 264 and 268 are positioned proximate conductor coils 236 such that, when heating is desired, heat from conductor coils 236 is transmitted through wall portions 264 and 268 to heat the fluid within fluid cavity 228. Similarly, during operation, the relatively cool fluid flowing passed wall 262 acts to cool conductor coils 236 and stator core 234 of stator assembly 232 and also to cool electronics module 244.

In operation, electronics module 244 is configured to apply a voltage to one or more of conductor coils 236 at a time for commutating conductor coils 236 in a preselected sequence to rotate rotor assembly 240 about axis 226. Conductor coils 236 coupled to stator core 234 are energized in a chronological sequence that provides an axial magnetic field which moves clockwise or counterclockwise around stator core 234 depending on the pre-determined sequence or order in which conductor coils 236 are energized. This moving magnetic field intersects with the flux field created by permanent magnets 250 to cause rotor assembly 240 to rotate about axis 226 relative to stator assembly 232 in the desired direction.

In the exemplary embodiment, the voltage applied to conductor coils 236 can be controlled such that the electrical energy within conductor coils 236 is converted to heat energy 272 that radiates from coils 236. Furthermore, a frequency is applied to conductor coils 236 to change the magnetic flux in rotor assembly 240 such that electromagnetic parts of rotor assembly 240, i.e. rotor disk 246 are heated. Heat energy 272 radiates from conductor coils 236 and is transmitted to the fluid within fluid cavity 228. More specifically, heat energy 272 is transmitted from conductor coils 236 and through axial portion 264 and radial portion 268 of wall 262 to the fluid within fluid cavity 228. Furthermore, because rotor assembly 240 is positioned proximate stator assembly 232, heat energy 272 also facilitates heating magnet 250 and/or rotor disk 246 such that the fluid immediately surrounding magnet 250 and/or rotor disk 246 increases in temperature. Induction heating of pump assembly 200 as described herein serves to either prevent the fluid from freezing or to defrost already frozen fluid.

In the exemplary embodiment, the pump assembly 200 may be located in an environment that causes the fluid within fluid cavity 228 to freeze when pump assembly 200 is non-operational. Because rotor assembly 240 and impeller 204 are submerged in the fluid, when the fluid freezes, rotor assembly 240 and impeller 204 may be locked in place. In such a situation, voltage can be applied in a manner to heat conductor coils 236 without causing rotation of rotor assembly 240. Heat energy 272 is then transmitted through wall 262 to the frozen fluid and to magnet 250 and/or rotor disk 246 to facilitate thawing the fluid to enable rotation of submerged rotor assembly 240 and impeller 204. Specifically, heat energy 272 is transmitted to axial gap 254 and to radial gap 266 to facilitate heating the fluid therein. Coupling rotor assembly 240 to impeller 204 and positioning rotor assembly 240 and impeller 204 within fluid cavity 228 and also in close proximity to conductor coils 236 of stator assembly 232 enables heat energy 272 to increase the temperature of the fluid within cavity 272 and also increase the temperature of magnet 250 and/or rotor disk 246. Furthermore, submerging rotor assembly 240 in the fluid within fluid cavity 228 exposes rotor assembly 240 to the fluid, which facilitates cooling magnet 250 and/or rotor disk 246 and prevents rotor assembly 240 from exceeding a predetermined temperature limit.

Additionally, during standard operation, both conductor coils 236 and electronics module 244 generate heat that may require cooling to prevent conductor coils 236 and electronics module 244 from exceeding a predetermined temperature limit. In the exemplary embodiment, conductor coils 236 and electronics module 244 are positioned with motor housing 208 of pump assembly 200 within close proximity of fluid cavity 228. As described above, the relatively cool fluid flows along axial portion 264 and radial portion 268 of wall 262 such that the temperature of wall 262 is reduced. The cooled wall 262 reduces the temperature of motor cavity 245, which facilitates cooling conductor coils 236 and electronics module 244 within cavity 245. The close proximity of conductor coils 236 and electronics module 244 within motor cavity 245 to the fluid within fluid cavity 228 of pump housing 206 facilitates reducing the temperature of conductor coils 236 and electronics module 244.

The apparatus, methods, and systems described herein provide a pump assembly having an electric motor coupled to an impeller. More specifically, a rotor assembly of the motor is directly coupled to the impeller. The rotor assembly is subject to an axial suction force from the stator assembly, and the impeller is subject to an axial suction force from the fluid flowing therethrough. As described herein, the axial suction force acts in an opposite direction of the axial magnetic force to reduce the sum of the forces, which facilitates extending the service lifetime of the motor assembly, and, specifically, the bearing assembly.

Furthermore, directly coupling the rotor assembly and the impeller and positioning the rotor assembly proximate the stator assembly enables heat transfer from the stator assembly to the rotor assembly and the fluid within the pump. More specifically, voltage is applied to a plurality of conductor coils of the stator assembly to increase the temperature of the conductor coils. Heat energy radiates from the conductor coils and is transmitted through a wall of the motor housing to the rotor assembly and to the fluid in which the rotor assembly is submerged to facilitate increasing the temperature of the fluid and the rotor assembly. Additionally, submerging the rotor assembly in the fluid exposes the rotor assembly to the fluid, which facilitates cooling components of the rotor assembly and prevents the rotor assembly from overheating. Furthermore, the close proximity of the conductor coils and the electronics module within the motor cavity to the fluid within the fluid cavity of the pump housing facilitates cooling the conductor coils and the electronics module.

Exemplary embodiments of the centrifugal pump assembly are described above in detail. The centrifugal pump assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor assembly for pumping a fluid through a fluid cavity, said electric motor assembly comprising:
   a stator assembly comprising a plurality of conduction coils, wherein said conduction coils are configured to transmit heat energy to the fluid within the fluid cavity;
   a rotor assembly positioned adjacent said stator assembly to define an axial gap therebetween;
   a motor housing configured to house said stator assembly, wherein said motor housing comprises a wall configured to separate the rotor assembly from said stator assembly, wherein said motor housing prevents flow of the fluid along an axial end of said stator assembly opposite said rotor assembly; and
   an impeller directly coupled to said rotor assembly opposite said stator assembly such that said rotor assembly and said impeller are configured to rotate about an axis, wherein said rotor assembly and said impeller are configured to be submerged in the fluid within the fluid cavity, wherein said wall extends radially outward beyond a radially outward end of said impeller, and wherein an axially-oriented fluid flow channel is defined by and between said wall and said impeller, wherein said axially-oriented fluid flow channel is positioned radially inward of said stator assembly and wherein said wall further defines a fluid channel radially outward of said conductor coils, said fluid channel being in fluid communication with the fluid cavity.

2. The electric motor assembly in accordance with claim 1, wherein said wall comprises an axial portion positioned immediately radially inward of said conductor coils.

3. The electric motor assembly in accordance with claim 2, wherein said impeller comprises an axial extension, and wherein a radial gap is defined between said axial extension and said wall axial portion.

4. The electric motor assembly in accordance with claim 1, wherein said wall comprises a radial portion extending radially within said axial gap between said stator assembly and said rotor assembly.

5. The electric motor assembly in accordance with claim 1, wherein said conductor coils are configured to transmit the heat energy through said wall to heat the fluid within the fluid cavity.

6. The pump assembly in accordance with claim 1, wherein an axial portion of said wall separates said stator assembly from said impeller, such that said axially-oriented fluid channel extends along said impeller opposite said conduction coils from said axial portion of the wall.

7. The electric motor assembly in accordance with claim 1, wherein said rotor assembly comprises a rotor disk and a plurality of permanent magnets, wherein said rotor disk is coupled to said impeller.

8. The electric motor assembly in accordance with claim 7, wherein said impeller comprises a front plate defining an inlet and an opposing rear plate, said rear plate coupled to said rotor disk.

9. A pump assembly comprising:
   a pump housing defining a fluid cavity;
   a motor housing coupled to said pump housing, wherein said motor housing comprises a wall having an axial portion and a radial portion;
   an electric motor assembly comprising:
      a stator assembly positioned within said motor housing and comprising a plurality of conduction coils, wherein said conduction coils are configured to transmit heat energy to a fluid within the fluid cavity; and
      a rotor assembly positioned adjacent said stator assembly and within said pump housing, wherein said wall is configured to separate said fluid cavity from said stator assembly, to limit fluid flow to within said pump housing, and to seal said stator assembly from said rotor assembly; and
      an impeller directly coupled to said rotor assembly opposite said stator assembly such that said rotor assembly and said impeller are configured to rotate about an axis, wherein said rotor assembly and said impeller are configured to be submerged in the fluid within the fluid cavity, wherein said wall extends radially outward beyond a radially outward end of said impeller, and wherein an axially-oriented fluid flow channel is defined by and between said wall axial portion and said impeller, wherein said axial portion separates said stator assembly from said impeller such that said axially-oriented fluid channel extends along said impeller opposite said conduction coils from said axial portion; and wherein said motor housing prevents flow of the fluid along an axial end of said stator assembly opposite said rotor assembly and said wall further defines a fluid channel radially outward of said conductor coils, said fluid channel being in fluid communication with the fluid cavity.

10. The pump assembly in accordance with claim 9, wherein said axial portion is positioned immediately radially inward of said conductor coils and said radial portion extends radially within an axial gap between said conductor coils and said rotor assembly.

11. The pump assembly in accordance with claim 9, wherein said impeller comprises an axial extension, and wherein a radial gap is defined between said axial extension and said wall axial portion.

12. The pump assembly in accordance with claim 9, wherein said conductor coils are configured to transmit the heat energy through said wall to heat the fluid within the fluid cavity.

13. The pump assembly in accordance with claim 9, wherein said axial portion and said radial portion of said wall are integrally formed.

14. The pump assembly in accordance with claim 9, wherein said axially-oriented fluid flow channel is positioned radially inward of said stator assembly.

15. A method of assembling a pump assembly for pumping a fluid through a fluid cavity, said method comprising:
providing a stator assembly including a plurality of conduction coils, wherein the conduction coils are configured to transmit heat energy to the fluid within the fluid cavity;
coupling the stator assembly within a motor housing such that the conductor coils are positioned proximate a wall of the motor housing;
positioning a rotor assembly adjacent the stator assembly such that an axial gap is defined therebetween, wherein the wall separates the rotor assembly from the conductor coils, wherein the motor housing prevents flow of the fluid along an axial end of the stator assembly opposite the rotor; and
coupling an impeller directly to the rotor assembly opposite the stator assembly such that the rotor assembly and the impeller are configured to rotate about an axis, wherein the rotor assembly and the impeller are configured to be submerged in the fluid within the fluid cavity, wherein the wall extends radially outward beyond a radially outward end of the impeller, and wherein an axially-oriented fluid flow channel is defined by and between the wall and the impeller, wherein the axially-oriented fluid flow channel is positioned radially inward of the stator assembly and wherein said wall further defines a fluid channel radially outward of said conductor coils, said fluid channel being in fluid communication with the fluid cavity.

16. The method in accordance with claim 15, wherein submerging the rotor assembly within the fluid comprises exposing the rotor assembly to the fluid such that the rotor assembly is cooled by the fluid.

17. The method in accordance with claim 15, further comprising:
coupling a pump housing to the motor housing, wherein the pump housing defines the fluid cavity; and
positioning the rotor assembly and the impeller within the fluid cavity in the pump housing.

18. The method in accordance with claim 17, wherein positioning the rotor assembly adjacent the stator assembly comprises positioning the rotor assembly adjacent the stator assembly such that the conductor coils transmit the heat energy through the wall to the fluid within the fluid cavity.

19. The method in accordance with claim 17, wherein coupling the conductor coils proximate a wall of the motor housing comprises:
coupling the conductor coils proximate an axial portion of the wall positioned immediately radially inward of the conductor coils; and
coupling the conductor coils proximate a radial portion of the wall extending radially within the axial gap between the conductor coils and the rotor assembly.

\* \* \* \* \*